Jan. 14, 1941.  J. J. HOPFIELD  2,228,352
UNITING OF GLASS TO GLASS AND METALS TO GLASS
Filed Sept. 15, 1939  2 Sheets-Sheet 1

Inventor
JOHN J. HOPFIELD.
By Frank Fraser
Attorney

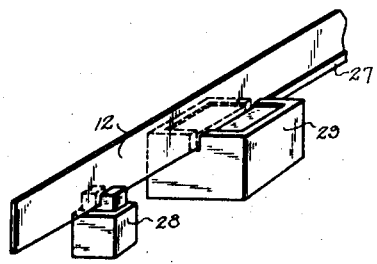
Fig. 6.
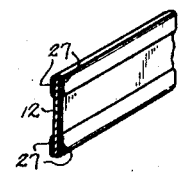
Fig. 7.
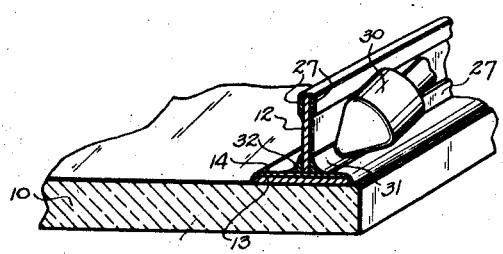
Fig. 8.
Fig. 9.
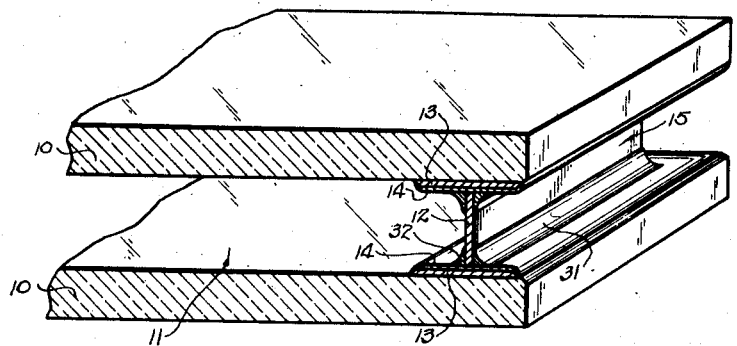
Inventor
JOHN J. HOPFIELD.
By
Frank Fraser
Attorney Patented Jan. 14, 1941

2,228,352

UNITED STATES PATENT OFFICE 2,228,352

UNITING OF GLASS TO GLASS AND METALS TO GLASS

John J. Hopfield, Toledo, Ohio, assignor to Libbey-Owens-Ford Glass Company, Toledo, Ohio, a corporation of Ohio Application September 15, 1939, Serial No. 295,101

9 Claims. (Cl. 148—25)

The present invention relates generally to improvements in the uniting of glass to glass and metals to glass.

In the uniting of glass to glass and metals to glass by a soldering operation, it has been found that a metal such as copper or an alloy of copper can be satisfactorily sprayed onto the glass with a metallizing gun, and that this coating of metal on the glass can then be used for the basic coat of the soldering operations.

When using copper or some of its alloys, the coefficient of expansion of which differs considerably from that of the glass, it is necessary to limit the metallizing of the glass to relatively thin coats of metal. If this is not done, the metal, on cooling from the relatively high temperature of the metallizing operation, tends to strip off the glass taking with it a thin scale of the glass.

On the other hand, when a sufficiently thin coat of such metal is sprayed upon the glass to avoid the above difficulty, then, although there may be ample metal for the necessary strength of construction, the surface density of the metal on the glass is so small that if a strong flux is used in tinning preliminary to further soldering operations, corrosion of the metal against the glass is very apt to set in and after a few months or years, depending on conditions of use, the bond of metal to glass is destroyed and the construction fails.

It is an aim of this invention to obviate the rapid corrosion of the metallic coating against the glass, and this is herein accomplished by the provision of new and useful fluxing materials for tinning the metallic coating preliminary to the soldering operations.

The fluxes herein provided may be used in a large number of different ways in the soldering of glass to glass and metals to glass, so that the invention is not limited to the use of these fluxes in connection with any particular soldering operation or operations. By way of example, however, it might be pointed out that the fluxes are of utility in the making of multiple glass sheet glazing units and especially that type of unit comprising two or more sheets of glass spaced apart by metal separator means bonded to the glass sheets around the marginal portions thereof through the intermediary of a metallic coating or coatings to form an all glass-metal hermetically sealed structure.

Other objects and advantages of the invention will become more apparent during the course of the following description, when taken in connection with the accompanying drawings.

In the drawings, wherein like numerals are employed to designate like parts throughout the same:

Fig. 6 is a perspective view illustrating the deposition of solder or other bond inducing material along the marginal portions of the metal separator means;

Fig. 7 is a perspective sectional view of the metal separator means after it has been precoated in the desired manner with the solder or other bond inducing material;

Fig. 8 is a fragmentary perspective view showing the bonding or sweating of the metal separator means to one of the glass sheets; and Fig. 9 is a fragmentary transverse sectional view through a glazing unit after the metal separator means has been secured in position between two sheets of glass.

Figure 1:
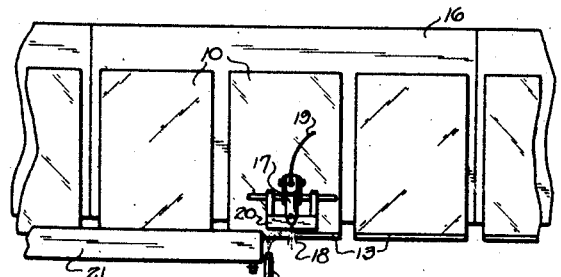
Fig. 1 is a fragmentary plan view of one form of apparatus which may be used for heating the edges of the glass sheets and for applying a metallic coating along the marginal portions thereof.

In Fig. 9 of the drawings is illustrated a multiple glazing unit consisting generally of two sheets of glass 10—10 arranged in spaced, substantially parallel relation to provide an insulating air space 11 therebetween. This air space is formed by the use of separator means in the form of metal strips 12 joined to the glass sheets through the intermediary of the metallic coatings 13 and 14. The separator strips 12 may be arranged inwardly of the outer edges of the glass sheets to form a channel 15 which may be filled with a suitable weather-proof seal. This seal may consist either of an organic or inorganic material. However, the use of the sealing material may not always be required and, likewise, the separator strips can be associated with the glass sheets so that they are flush with the peripheral edges thereof if desired.

As will be readily appreciated two or more sheets of glass can be fabricated into a glazing unit of this character giving one or more spaces between adjacent glass sheets as occasion may require. Therefore, while the invention has been illustrated in the drawings and will be herein described as applied to a two sheet unit, it will be understood that the invention is in no way confined to any particular number of glass sheets used or spaces between the sheets.

In view of the fact that the inner surfaces of the glass sheets cannot be cleaned after the unit is made and installed, it is highly desirable to use glass which is stable when in use. Likewise, before the unit is completed, the inner surfaces of the glass sheets should be thoroughly cleaned not only for the sake of appearance and permanency of unit but also to facilitate application of the metallic coatings upon the glass in a manner to obtain permanent and adequate adhesion or bond between the glass and metal.

Although not essential, it is preferred that the coatings 13 on the glass sheets be produced from pure copper or an alloy of copper as it has been found that pure copper and some of its alloys can be sprayed upon the glass very satisfactorily and also weathers well in use. It is important, however, that the temperature of the glass be properly controlled at the time the metal is applied thereto. It may be mentioned that bronze may be used in lieu of copper and no doubt other satisfactory metals or metal alloys or multiple coats of different metals can be substituted for the copper coatings.

It is also preferred that the separator strips 12 be made from lead and that the lead separator strips and copper or other metallic coatings 13 on the glass be joined together by means of the layers 14 of solder or other inorganic bonding material. The soldering of the parts together is in effect a sweat job and the materials are so controlled both as to composition and form that reinforcing or strengthening fillets or accumulations of solder are formed on both sides of the separator strips to strengthen the construction and thus help to insure its permanency as will be more fully hereinafter described.

The use of ordinary solder results in relatively high working temperatures with the soldering irons or other sources of heat whereby undesirable strains are set up between the copper or other metal coat and the glass. Therefore, it is preferred to make use of a low melting point solder with a wide plastic range of melting so as to reduce the temperature of applications and make use of a more plastic range of the solidifying points of the solder for the purpose of easier assembly. There are a number of variations of soft solders which can be used, and one which I have found to work satisfactorily consists of approximately 40 parts bismuth, 40 parts lead, and 20 parts tin.

In Fig. 1 is illustrated diagrammatically one type of apparatus and method for applying the copper or other base coating of metal 12 to the marginal edge portions of the glass sheets. As shown, the glass sheets 10 to be metallized rest horizontally upon and are carried forwardly by a suitable conveyor 16 beneath a metallizing gun 17. This gun may be of any construction capable of producing a spray of metal 18 which can be directed upon the pre-selected edge portions of the glass sheets moving thereunder. While it may be possible to apply the metal coating to the glass electrolytically or otherwise, I prefer that a spray gun be used in which a metal wire 19 is fed into the gun, melted, and sprayed in fine particles upon the glass. The deposit of metal upon the glass is not only controlled by the relative position of the metallizing gun with respect to the glass, speed of wire through the gun, and speed of movement of the glass, but also by a guard member 20 which may be used for this purpose.

Before the metal is sprayed upon the glass, the marginal edge portions of the glass sheet are first preferably heated to prevent thermal shock of the glass itself and also to enable a proper bonding of the metal to the glass. The exact temperature used will vary somewhat with the size and thickness of glass, but in all cases care should be exercised to avoid warpage of the glass, and heating should be confined to that area below the critical annealing point of the glass. For ordinary plate and window glass, I have found a temperature of between 500 and 600 degrees Fahrenheit to be satisfactory. Heating of the glass sheets in this way prior to spraying of the metal thereon results in an excellent bond between the glass and metal.

To this end, as the glass sheet 10 is carried along by the conveyor 16 and before it reaches the metal spray gun 17, the forward marginal edge portion of the sheet, which projects beyond the conveyor, passes through an electrical heating device 21. The number of heaters and length of heating zone are dependent upon the speed of the machine and exact operating temperatures desired. It is preferred that the heating be done as rapidly as possible and confined to a narrow strip at the edge of the glass. This serves to confine the compressional strain to a narrow band and helps to prevent warping and breaking of the glass. After the glass sheet passes beyond the heating device 21 and just before the metal is sprayed thereon, the marginal edge portion thereof is subjected to the action of one or more burners 22 which heat the surface of the glass to the desired maximum temperature for the reception of the metal spray.

The heating means is so controlled that when the glass reaches a position under the metal spray gun, it is within the predetermined temperature range desired. The conveyor 16 is preferably moved continuously forwardly and successive sheets of glass 10 are presented progressively to the spray of metal 18 issuing from the gun 17. After the glass sheet has been coated with the metal, it is desired that means be provided for permitting a gradual lowering of the glass temperature to that of the surrounding atmosphere, for this has the effect of annealing the metallized glass edge portion and results in a better adhering metal coat.

Figure 2:
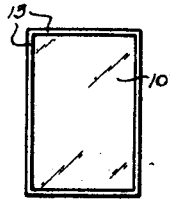
Fig. 2 is a face view of one of the glass sheets with the metallic coating applied entirely around the marginal portions thereof.

After one edge or marginal portion of the glass sheet has been coated with metal, it is of course necessary to similarly treat the remaining edges or marginal portions before fabricating the glass into a double glazing unit. A glass sheet 10 having the four marginal portions thereof provided with the metallic coating 13 is shown in Fig. 2.

Figure 3:
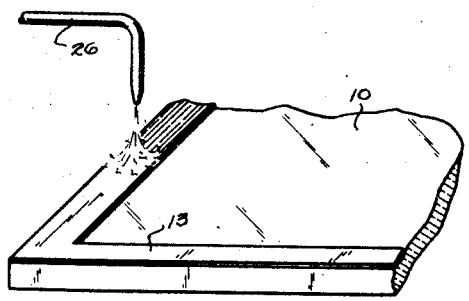
Fig. 3 illustrates diagrammatically the use of a hydrogen flame for removing oxide from the metallic coating.
Figure 4:
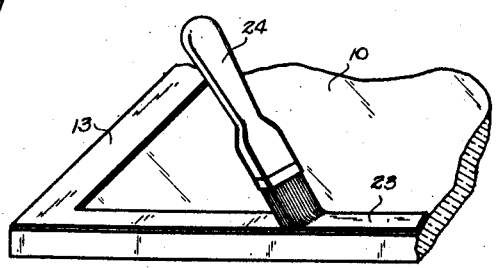
Fig. 4 is a perspective view illustrating diagrammatically the application of the fluxing material to the metallic coating on the glass.
Figure 5:
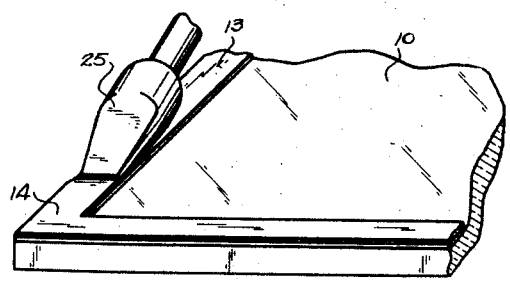
Fig. 5 is a fragmentary perspective view illustrating the depositing of a coating of solder upon the metallized border on the glass sheet.

After the metallic coating 13 has been applied to the glass sheet, it is then further prepared by applying thereto the layer 14 of solder which, as stated above, consists preferably of a low melting point solder. As a matter of precaution and to insure the utmost of cleanliness, a flux is preferably used to get a permanent satisfactory union between the solder layer 14 and the metallic coating 13 on the glass. However, after the copper or other metallic coating 13 has been applied to the glass, there is a tendency toward oxidation thereof. Therefore, to facilitate tinning of the metal coated glass, this oxidation should be removed before the flux is applied and for this purpose the copper or other metallic coating may be subjected to a fine hydrogen flame which can be passed over the metallic coating by means of a burner or the like 26 (Fig. 3). A film 23 of the flux material can then be applied to the metallic coating 13 by means of a brush 24 (Fig. 4) or in any other desired manner. The flux treated metallic coating may then be coated with the layer of solder 14 as shown in Fig. 5, wherein a soldering iron 25 is being run over the metallic coating to leave the solder layer thereon.

I have discovered that the following materials are fluxing materials and that they can be satisfactorily used in the soldering of glass to glass and metals to glass after the glass has been previously coated with either copper or a solderable alloy:

Ethylene glycol
Diethylene glycol
Triethylene glycol
Tetraethylene glycol
Triethanolamine These fluxing materials may be used either alone or any two or more of the materials may be combined with one another to form a mixture. In general, these fluxes are milder than those which have zinc chloride as a constituent.

Since with the above constituents water soluble fluxes can be made, water can be used to dilute them. However, in some operations where it is desired to used diluted flux for soldering, the spattering incident to the use of water is objectionable. In such cases, acetone can be used and makes a diluent that rapidly evaporates on application of the flux to the article to be soldered so that no spattering results. I have discovered that acetone can not only be used as a diluent for the above fluxing materials and mixtures thereof but that it may also be used as a diluent for other fluxes such as zinc chloride and phosphoric acid flux.

If desired, the fluxing materials set forth above may also be combined with zinc chloride ($ZnCl_2$), water, and acetone. Some of the combination fluxes which I have made are:

Ethylene glycol + $ZnCl_2$ + water
Ethylene glycol + $ZnCl_2$ + water + acetone
Diethylene glycol + $ZnCl_2$ + water
Diethylene glycol + $ZnCl_2$ + water + acetone Similar mixtures of triethylene glycol, tetraethylene glycol, and triethanolamine with zinc chloride, water, and acetone may also be used. Likewise, fluxes of more than two active components may be formed. For example, ethylene glycol, diethylene glycol, and triethanolamine may be used in combination with zinc chloride only, or with zinc chloride combined with diluents such as water and acetone. Many other combinations of the above materials and in almost an infinite variety of proportions are possible and will work satisfactorily as a flux for soldering. If, however, zinc chloride is present in any of them in a sensible amount, the above fluxes when used for a flux in tinning the sprayed metal on the glass share the corroding effects of the zinc chloride. Consequently, while zinc chloride can be combined with the above materials, such a mixture would have a relatively greater corrosion effect on the glass than if the zinc chloride were omitted.

I have also used a flux material made by combining triethanolamine with abietic acid. Abietic acid (purified wood rosin) when added to triethanolamine, which is a base, apparently reacts with it to form a new material. Thus, abietic acid is practically insoluble in water but when it is combined with sufficient triethanolamine, it forms a product that is soluble in water, while at the same time the fluxing action of this material for soldering purposes is retained. Although I have not identified the compound formed by the action of abietic acid and triethanolamine, the known structure of the two substances and the analogy to other similar substances indicates that an addition product of abietic acid and triethanolamine is formed due to the probable increase of the valence of nitrogen in the triethanolamine from three to five. Accelerated corrosion tests of soldered glass in which this modified abietic acid was used indicate that corrosion is about ten times as slow as if a flux consisting chiefly of a solution of zinc chloride were used. Since suitable proportions of the constituents of this flux result in one that is soluble in water, the residual flux on the soldered article can be washed off with water. This is one of its chief advantages over rosin and alcohol used as a flux with negligible corrosion characteristics.

Another mixture which I have used with satisfactory results in the making of multiple glass sheet glazing units is:

| | Per cent |
|---|---|
| Diethylene glycol | 40 |
| Triethanolamine | 35 |
| Abietic acid | 25 |

This flux is made by putting the above ingredients together and heating them to around 300 degrees F., or until the abietic acid, which is a solid, is dissolved. The above mixture formed a relatively thick syrup when cold and was thinned with acetone in the proportions of eight parts acetone to one part of the mixture to make it easy to handle. The above proportions may of course be varied. Abietic acid may also be employed in combination with ethylene glycol, triethylene glycol, and tetraethylene glycol.

When spraying copper or an alloy of copper upon a glass surface, there is sometimes a tendency for the metal spray, upon hitting the glass, to fracture the glass surface resulting in almost microscopic chips being removed from the glass body. This is termed "point-shock" and is objectionable in the finished glazing unit as it causes light refraction. I have discovered that when using a flux comprising triethanolamine and abietic acid or diethylene glycol, triethanolamine and abietic acid, the glass fractures or "point-shock" will be healed by the flux. That is to say, the flux will penetrate the granular structure of the sprayed metal coat and fill the interstices that exist between the sprayed metal particles. In other words, by the heat of the soldering operation, the flux might be fixed into a gummy mass in the interstices between the metal particles and thus renders the metal to glass seal more nearly vacuum tight. Of course, since the interstices are small, the amount of the flux in the seal would be minute. I also found that the soldering operation can be improved by slightly abrading the flux after it is applied to the sprayed metallic coating. This can be done either by rubbing it lightly with steel wool or by the use of relatively soft wire brushes.

After two sheets of glass have been provided with the metallic coatings 13 and 14 they are adapted to be secured together in spaced, substantially parallel relation as shown in Fig. 9, by means of interposed metal separator strips 12. The separator strips 12 are preferably formed of lead or a lead alloy, and to enable joining of the separator strips to the metal coated glass sheets there is applied to both sides of the strips along the marginal edges thereof, first a flux and then a deposit of solder 27 (Fig. 7).

The solder deposits 27 applied to the edges of the separator strips 12 consist preferably of a low melting point solder having a wide plastic range with a minimum plastic temperature. The use of a low melting point solder is also of benefit during the time of sweating the soldered metallic coating on the glass to the soldered lead separator strips whereby a low temperature iron may be used without melting down the lead strips. The edges of the separator strips may be coated in the manner illustrated in Fig. 7 by passing the strips first through a flux applying device 28 and then through a container 29 of molten solder. Any other preferred means of building up the solder deposits on the strips 12 may of course be employed. The separator strips are now ready for association with the glass sheets.

To join the prepared separator strips 12 to one of the glass sheets they are associated therewith substantially as shown in Fig. 8. Ordinarily, it is desirable to place the separator strips back from the edges of the glass sheet and approximately centrally of the metallic coating 13 to produce the channel 15 for receiving the weatherproofing seal, although this is of course a matter of choice.

An electric iron 30 or other heating means may be employed to elevate the temperature of solder deposits 27 and the solder coating 14 to induce flowing of the solder to produce a fillet 31 on one side of the separator strips and a second fillet 32 on the opposite side of said strips. In this way, the solder completely surrounds the edges of the separator strips giving what may be called a sweat joint and producing fillets on both sides of the separator strips to give a balanced type of joint capable of standing strain and stresses in both directions laterally of said separator strips.

For purposes of illustration, the fillets 31 and 32 are shown as separate from the solder coating 14 on the metallized border 13. While these solder deposits are of course independent of one another initially, part of the solder being applied originally to the separator strips and the other solder being applied to the metallized coating on the glass, during the joining together the solder of course blends or amalgamates into a single mass or volume of solder permanently adherent to the separator strips and metallized coating on the glass and shaped as fillets for mechnical strength.

In joining the separator strips to the first sheet of glass, it is obviously possible to apply the soldering iron to both sides of the separator strips for soldering purposes, but this of course is impossible when the second sheet of glass is being joined to the separator strips. However, by preparing the separator strips with substantial deposits of solder on both sides thereof, the heat applied on one side of the strips is sufficent to cause proper flowing of the solder on both sides. That is, in Fig. 8 proper control of temperature application with the iron 30 in the manner shown will result in the formation of not only the fillet 31 upon that side of the separator strip in contact with the iron but will also result in formation of the fillet 32 on the opposite side of the separator strip.

After the separator strips have been joined to the first sheet of glass, the assembly so formed is then preferably inverted over a second sheet of glass 10 and the soldering job completed by operating the iron or other heating element on the exterior coating of solder carried by the separator strips. This, as has already been explained, will result in sweating together or joining of the separator strips and prepared metal coating on the glass as well as formation of the fillets 31 and 32. While I have referred to the separator means as comprising metal strips, a single length of metal may be used for the separator and shaped to form a continuous strip.

After the glass sheets and metal separator strips have been joined together and to insure desired permanency, it is preferred to establish a predetermined air or gas condition within the space between the glass sheets. To accomplsh this, the separator strips may be punctured at two or more points to permit insertion of hypodermic needles or other instruments which allow passage of dehydrated air through the space to prevent later condensation within the space or fogging of the unit when in use. In most cases, dehydrated air at normal atmospheric pressure will be satisfactory, but for other uses a partially evacuated condition or even a pressure above atmospheric pressure may be desirable. Likewise, inert gases may be sealed within the unit for some uses. The unit is then ready for use and can be installed without further preparation. As pointed out above, however, the channel 15 around the edges of the unit may be filled with a suitable weather-proof sealing material if desired.

As brought out above, it is the aim of this invention to provide new and useful fluxes for general use in the soldering of glass to glass and metals to glass and that the invention is not restricted to the use of such new and useful fluxes in the making of multiple glass sheet glazing units of the character herein disclosed, although this is one purpose for which the fluxes may be advantageously employed.

I claim:

1. The method of preparing a metallized glass surface for soldering to a metal element, including the step of treating said metallized glass surface preparatory to soldering with a flux comprising triethanolamine and a water soluble glycol selected from the group consisting of ethylene glycol, diethylene glycol, triethylene glycol and tetraethylene glycol.

2. The method of preparing a metallized glass surface for soldering to a metal element, including the step of treating said metallized glass surface preparatory to soldering with a flux comprising triethanolamine, abietic acid and a water soluble glycol selected from the group consisting of ethylene glycol, diethylene glycol, triethylene glycol and tetraethylene glycol.

3. The method of preparing a metallized glass surface for soldering to a metal element, including the step of treating said metallized glass surface preparatory to soldering with a flux comprising approximately 35% triethanolamine, approximately 25% abietic acid and approximately 40% of a water soluble glycol selected from the group consisting of ethylene glycol, diethylene glycol, triethylene glycol and tetraethylene glycol.

4. The method of joining a glass element and a metal element to provide a unitary structure, including the steps of spraying a metallic coating upon a surface of the glass element, treating said metallic coating with a flux comprising triethanolamine and a water soluble glycol selected from the group consisting of ethylene glycol, diethylene glycol, triethylene glycol and tetraethylene glycol, applying a layer of solder to the flux treated metallic coating, and then securing the metal element to the layer of solder by a soldering operation.

5. The method of joining a glass element and a metal element to provide a unitary structure, including the steps of spraying a metallic coating upon a surface of the glass element, treating said metallic coating with a flux comprising triethanolamine, abietic acid and a water soluble glycol selected from the group consisting of ethylene glycol, diethylene glycol, triethylene glycol and tetraethylene glycol, applying a layer of solder to the flux treated metallic coating, and then securing the metal element to the layer of solder by a soldering operation.

6. The method of joining a glass element and a metal element to provide a unitary structure, including the steps of spraying a metallic coating upon a surface of the glass element, treating said metallic coating with a flux comprising approximately 35% triethanolamine, approximately 25% abietic acid and approximately 40% of a water soluble glycol selected from the group consisting of ethylene glycol, diethylene glycol, triethylene glycol and tetraethylene glycol, applying a layer of solder to the flux treated metallic coating, and then securing the metal element to the layer of solder by a soldering operation.

7. The method of producing a multi-ply glass sheet glazing unit, including the steps of spraying copper ribbons around the marginal portions of two sheets of glass, treating said copper ribbons with a flux comprising triethanolamine and a water soluble glycol selected from the group consisting of ethylene glycol, diethylene glycol, triethylene glycol and tetraethylene glycol, applying coatings of solder to the copper ribbons, then precoating a strip of flexible-ductile metal with deposits of solder, positioning the metal strip between the glass sheets inwardly of the edges thereof and approximately centrally of said copper ribbons, and then heating the solder coatings on the copper ribbons and the solder deposits on the metal spacer strip to cause the flowing and amalgamation of said solder coatings and solder deposits to provide a hermetically sealed space between the sheets of glass.

8. The method of producing a multi-ply glass sheet glazing unit, including the steps of spraying copper ribbons around the marginal portions of two sheets of glass, treating said copper ribbons with a flux comprising triethanolamine, abietic acid and a water soluble glycol selected from the group consisting of ethylene glycol, diethylene glycol, triethylene glycol and tetraethylene glycol, applying coatings of solder to the copper ribbons, then precoating a strip of flexible-ductile metal with deposits of solder, positioning the metal strip between the glass sheets inwardly of the edges thereof and approximately centrally of said copper ribbons, and then heating the solder coatings on the copper ribbons and the solder deposits on the metal spacer strip to cause the flowing and amalgamation of said solder coatings and solder deposits to provide a hermetically sealed space between the sheets of glass.

9. The method of producing a multi-ply glass sheet glazing unit, including the steps of spraying copper ribbons around the marginal portions of two sheets of glass, treating said copper ribbons with a flux comprising approximately 35% triethanolamine, approximately 25% abietic acid and approximately 40% of a water soluble glycol selected from the group consisting of ethylene glycol, diethylene glycol, triethylene glycol and tetraethylene glycol, applying coatings of solder to the copper ribbons, then precoating a strip of flexible-ductile metal with deposits of solder, positioning the metal strip between the glass sheets inwardly of the edges thereof and approximately centrally of said copper ribbons, and then heating the solder coatings on the copper ribbons and the solder deposits on the metal spacer strip to cause the flowing and amalgamation of said solder coatings and solder deposits to provide a hermetically sealed space between the sheets of glass.

JOHN J. HOPFIELD.